May 5, 1942.  R. C. SMITH  2,282,008
HYDRAULIC CONTROL MECHANISM
Filed May 22, 1939   2 Sheets-Sheet 1
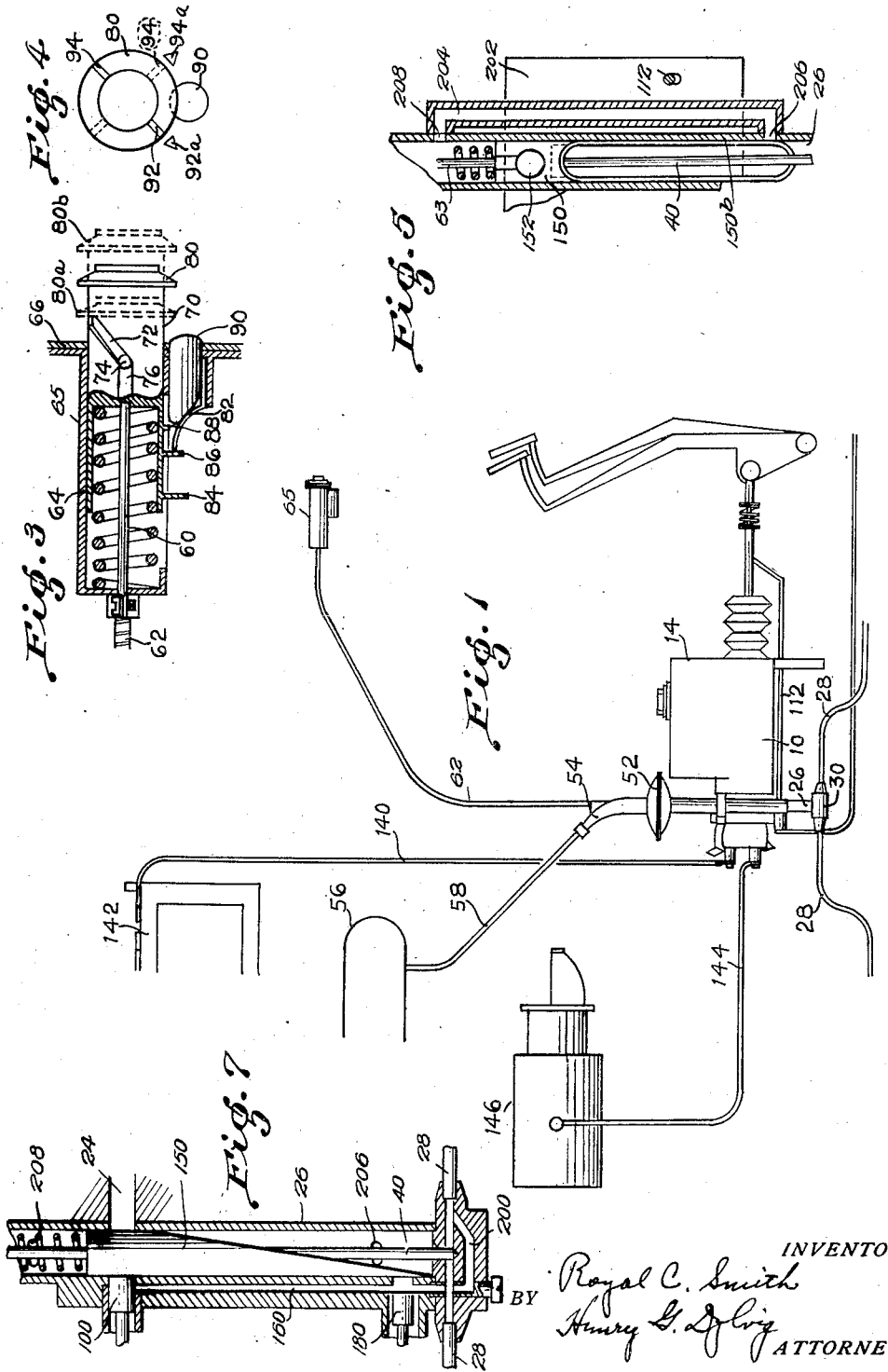

May 5, 1942.　　　　　R. C. SMITH　　　　　2,282,008
HYDRAULIC CONTROL MECHANISM
Filed May 22, 1939　　　2 Sheets-Sheet 2
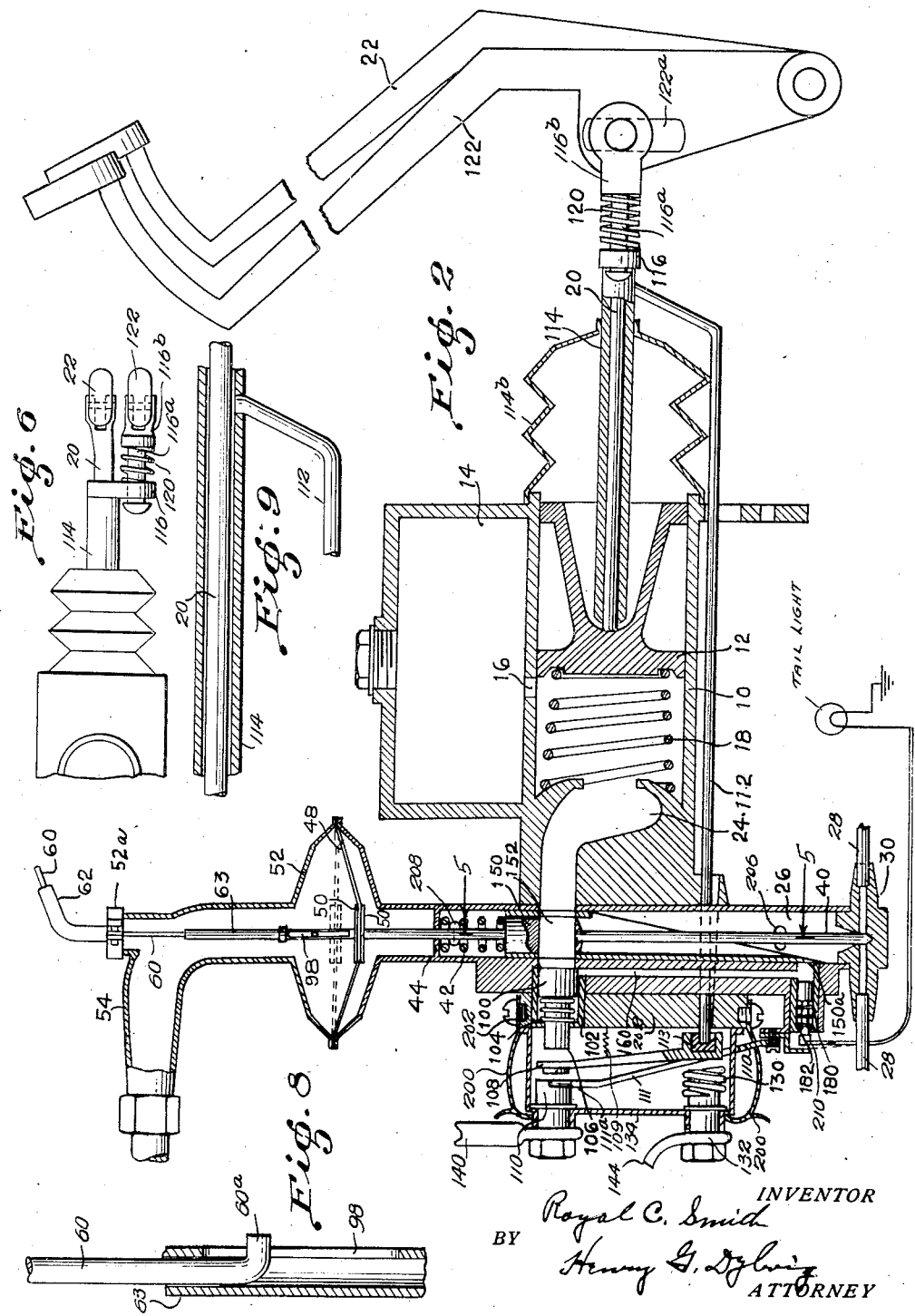

Patented May 5, 1942

2,282,008

UNITED STATES PATENT OFFICE 2,282,008

HYDRAULIC CONTROL MECHANISM

Royal C. Smith, Wilberforce, Ohio

Application May 22, 1939, Serial No. 275,127

18 Claims. (Cl. 192—.02)

This invention relates to motor vehicles and more particularly to the hydraulic control mechanism for the motor and the control of the brakes.

In driving motor vehicles it is very desirable to provide controls which are easily handled, especially during emergencies, such as the stalling of the motor on inclined grades, starting of the motor, et cetera. In the past, conventional motor vehicles utilize a clutch for engaging and disengaging the engine to and from the transmission, a brake pedal for applying the brakes and an accelerator pedal for controlling the fuel feed to the engine. These pedals are all operated by the feet. When the motor stalls on the side of a hill, or it is desirable to start while the motor vehicle is on an inclined grade, it is very desirable to apply the brakes until the clutch engages, at least in part, and at the same time it is quite desirable to step on the accelerator, so as to supply sufficient fuel to the motor. In other words, it is desirable to manipulate three pedals simultaneously with two feet, which is physically impossible.

An object of this invention is to provide a brake that is automatically released in response to predetermined movements of some other control mechanism.

Another object of this invention is to provide a valve mechanism in association with hydraulic brakes, which valve mechanism may be utilized to lock the brakes when the motor stalls and which valve mechanism is automatically released in response to predetermined control movements of the motor vehicle.

Another object of this invention is to provide brake control mechanism that is normally inoperative when the motor operates and operative to lock the brakes immediately upon the motor ceasing to operate.

Another object of this invention is to provide a lock for the brakes, which lock is releasable when the motor is started.

Another object of this invention is to provide a brake control mechanism responding in its operation to differentials in motor pressures.

Another object of this invention is to provide a locking mechanism for the brakes that responds to the operating condition of the motor.

Another object of this invention is to provide a starter switch responding to movement of the hydraulic brake fluid under predetermined conditions in starting the engine.

Another object of this invention is to provide a lock-out for the starter switch, operating in response to differential pressures created by the operation of the motor to lock the starter switch in inoperative position.

Another object of this invention is to provide a lock for the brake mechanism responding to differential in pressures created by the motor at the option of the driver.

Another object of this invention is to provide a lock for the brakes and manually controlled means for releasing the brakes.

Another object of this invention is to provide a hydraulically controlled switching mechanism for the starter in association with a check valve in the hydraulic brake mechanism.

Other objects and advantages reside in the construction of parts, the combination thereof and the mode of operation, as will become more apparent from the following description.

In the drawings, Figure 1 discloses a schematic illustration of a control mechanism for a motor vehicle.

Figure 2 is a cross sectional view of the main piston of the hydraulic brake system and a cross sectional view of the controls associated therewith.

Figure 3 is a fragmentary, sectional view of a control mechanism for the brake valve, which control mechanism is mounted on the instrument board of the motor vehicle.

Figure 4 is a detail end elevation of the control mechanism shown in Figure 3, as viewed by the operator of the motor vehicle.

Figure 5 is a fragmentary, cross sectional view taken substantially on the line 5—5 of Figure 2.

Figure 6 is a detail top plan view of a portion of the tank above the cylinder and of the brake and clutch pedals and parts associated therewith.

Figure 7 is a fragmentary, cross sectional view of a modification.

Figure 8 is a fragmentary, cross sectional view showing the connection of the control mechanism used in controlling the valve associated with the hydraulic fluid passages.

Figure 9 is a fragmentary, cross sectional view of the connection of the hydraulic clutch mechanism and the starter switch control mechanism.

Figures 8 and 9 are shown on a much larger scale than used in Figure 2.

In driving automobiles, trucks, busses and other motor vehicles, it is very desirable to have as few controls as possible for manipulating the vehicle. This is especially very desirable in emergencies, as for example, when the motor is stalled while ascending or descending a steep grade. When this occurs, it is necessary for the operator to simultaneously, if possible, release the clutch, hold the brakes and control the accelerator. This is facilitated at times by means of a manually controlled emergency brake, if one is available. At other times the driver is compelled to start the vehicle under these adverse conditions as best he can.

In the present embodiment disclosed herein, the brake may be automatically set when the engine is stalled. This brake that is locked in position may be released by the vacuum created in the motor when the motor starts. However, in the event the motor vehicle is stalled on a grade, the brakes may be held in locked position manually, while the driver controls the accelerator and permits the clutch to engage. Furthermore, the clutch pedal closes the starter switch only when the motor is dead. Immediately upon the motor starting, the starter switch is disconnected by the vacuum created by the engine. This vacuum also releases the brakes. This facilitates the starting of the motor vehicle, even though it may be stalled on a grade. The starting of the motor is accomplished by very few manual manipulations. This will appear more fully from the detailed description of the device, as disclosed in the drawings merely for the purpose of illustration and not as a limitation.

The hydraulic control mechanism for the motor vehicle including the starting switch closing mechanism, the starting switch lock-out mechanism, the brake locking mechanism and the tail light switch closing mechanism, is all incorporated into or associated with the hydraulic brake mechanism of the motor vehicle. This brake mechanism includes a master cylinder 10, provided with a movable piston 12 mounted for reciprocatory movement therein. Brake fluid or the hydraulic fluid is supplied from a tank 14 mounted over the piston and communicating therewith through a suitable passage 16. The piston 12 is actuated to the right, as viewed in Figure 2, by a spring 18 mounted within the cylinder. As may best be seen by referring to Figures 2 and 6, a piston rod 20 is connected to the brake pedal 22, so that the brake pedal 22 may be used in actuating the piston 12 against the force of the spring 18. The piston 12 is provided with an outlet passage 24, terminating in a downwardly projecting passage or conduit 26, normally communicating with the brake conduits 28 through a suitable T 30.

In Figure 2 the brake mechanism is shown in locked position. The brakes are locked in position by a needle valve 40 seated upon a valve seat in the T 30. The stem of the needle valve 40 is held in a "down" position, as viewed in Figure 2, by a helical spring 42 abutting a partition 44 in the conduit 26 and exerting a pressure against the collar 146 mounted upon the needle valve 40. The stem of the valve 40 projects through an aperture in the partition 44 and is connected to a flexible or movable diaphragm 48 by a pair of collars 50. The diaphragm 48 is mounted in a suitable housing 52, terminating in a tubular portion 54 connected to the engine 56 through a suitable pipe 58 in such a manner that as soon as the engine starts the vacuum created by the engine draws or sucks the diaphragm 48 upwardly into the dotted position, thereby unseating the valve 40 from its seat, so as to open or release the brakes under normal operating conditions.

The valve 40 may be controlled manually by a flexible rod or wire-like member 60 extending through a suitable conduit 62 to the instrument board, as shown in Figure 3. Within the housing 52 and the tubular extension 54 the rod 60 extends through a tubular sleeve 63 terminating in spaced relation from the collar 52a so as to provide a clearance for the free up and down movement of the sleeve 63 with the diaphragm 48. The conduit 62 is connected to a suitable casing 65 projecting forwardly from the instrument board 66. This casing may be held in position by any suitable fastening means, as for example, welding, rivets, screws or the like. The flexible rod 60 is seated in a cylindrical member 70 provided with a helical groove 72 straddling a suitable pin 74 fixed to the tubular casing 65.

The helical groove 72 merges into a longitudinal groove portion 76, so that the cylindrical member 70 may be rotated so as to advance the dial-like head 80 from the full line position to the "in" and dot-dash position 80a. It may also be pulled outwardly when the pin 74 follows the longitudinal groove 76 into the dot-dash position 80b. It may be locked in either position by a flexible spring member 82, engaging a series of stops 84, 86 and 88 in a tubular extension 64 integral with the cylindrical member 70, there being one stop for each of the positions. This spring 82 may be released by pressing a suitable plunger 90, located directly below the head or knob 80, as best viewed in Figure 4. The head is preferably provided with indicia 92 and 94 registering respectively with the indicant 92a, as shown in the full line position or with the indicant 94a, as shown by the dotted line position. The purpose of these positions will be described more fully later in connection with the operation of the hydraulic control mechanism.

The rod 60 is provided with a slip connection adjacent the diaphragm 48, which slip connection includes a slot 98 in the stem 40 and a suitable pin attached to the end of the rod 60. This permits the movement of the diaphragm 48 from the "down" position shown in full lines, to the dot-dash position, without any interference by the rod 60 and the position thereof, execpting in certain contingencies controlled by the driver.

When the control knob 80 is in the normal and full line position shown in Figure 3, the diaphragm 48 is free to drop into "down" position or advance into "up" position without interference from the control rod 60. When the knob 80 is in the dot-dash position 80b, the rod 60 holds the diaphragm 48 in the dot-dash or "up" position and with it the valve 40 and other parts associated therewith, as will be described more fully later. When the knob 80 is in this dot-dash position 80b, the hydraulic brakes cannot be locked, as the valve stem is held in the "up" position by the rod 60, the lower end of which engages the slot 98 in sleeve 63, as may best be seen by referring to Figure 8. The lower end 60a of the rod 60 is formed at right angles to the longitudinal axis of the adjacent portion of the rod 60, so that the end 60a of the rod 60 may engage either end of the slot 98 in the sleeve 63 to actuate this sleeve 63. This may be desirable if, for example, the driver desires to coast and turn off the engine. Then he would not wish to lock the brake system, but might desire to have the brakes available for any emergency. When the ignition switch has been turned off, the engine is standing still and does not create a vacuum, so that if the knob 80 is not advanced into the position 80b the brake system would then be locked in whatever position it happened to be at the time the engine stops.

At other times it may be desirable to lock the brake system even though the engine is operating. It may be desirable to apply the brakes and lock these in applied position while the motor vehicle is standing on a grade and at the same time permit the engine to idle. The engine idling would normally maintain the diaphragm in the dot-dash position and the valve 40 in the "open" position. However, by advancing the knob 80 from the full line position into the position 80a, the brakes are locked in position, as the valve stem is then advanced into the "down" position against the force of the diaphragm 48 and against the suction of the engine. Thus it is seen that by the use of the knob 80 it is possible to make the operation of the diaphragm 48 ineffective, so as to either maintain the valve "open" irrespective of the condition of the engine or to maintain the valve "closed" irrespective of the condition of the engine. Thereby a system is produced for controlling the brakes automatically under normal operating conditions, which automatic system may be manually controlled to take care of extraordinary conditions.

The hydraulic control mechanism, in addition to its function in applying and releasing the brakes, is also utilized to start the engine in the event it has been stalled or stopped. This is accomplished by actuating the clutch pedal, which releases the clutch in any suitable manner by a mechanism that has not been shown. As the clutch pedal is actuated to release the clutch, it also actuates the piston 12 so as to force the brake fluid from the cylinder 10 into the passages associated therewith. As may best be seen by referring to Figure 6, the clutch pedal 122, through a spring 120, actuates a bracket or extension 110 fixedly secured to or integral with tubular sleeve 114. This sleeve 114 moves independently of the rod 120. As may best be seen by referring to Figure 2, the sleeve 114 does not contact the piston 12 until the sleeve 114 has moved a short distance, so that the end of the sleeve 114 pushes the piston 12. By this arrangement the clutch pedal must move through a considerable distance before the piston 12 is actuated, in that some motion is lost through the resiliency of the spring 120 and some motion is lost through the space between the end of the tubular sleeve 114 and the piston 12. The clutch pedal 112 is duo-functional, in that it releases the clutch and actuates the piston 12. When the piston 12 is actuated to the left, as viewed in Figure 2, the fluid is ejected, at least in part, from the cylinder 10 into the passages associated therewith. Normally, when the engine is standing still the valve stem 40 is in the "down" position, so as to stop the flow of the fluid through the brake system. The fluid then exerts a pressure against the piston 100 seated in the cylinder 102 and biased to the right, as viewed in Figure 2, by a helical spring 104. This piston functions as a check valve. The fluid pumped by the piston 12 moving in the cylinder 10 urges the piston 100 against the spring 104, so as to actuate the plunger 106 against a contact lever 108, carrying a terminal actuated into contact with a fixed contact 110. The contact lever 108 is resiliently attached to the end of a rod 112 by means of a resilient insulating member 113, such as rubber vulcanized in position and thereby united to the parts. This permits a flexing movement of the upper end of the contact lever 108 relative to the reciprocatory rod 112. In order to bias the upper end of the lever 108 out of engagement with the adjacent contact when the rod 112 is actuated to the left as viewed in Figure 2, a spring 109 has one end connected to the lever 108 and the opposite end connected to the adjacent support. This contact lever 108 is insulatingly mounted upon the reciprocatory rod 112 fixedly attached to the tubular sleeve 114, which is actuated through the bracket 116 and the helical spring 120 from the clutch pedal 122. As may be clearly seen by referring to Figure 9, the end of the rod 112 may be press fitted into a suitable aperture in the sleeve 114. If necessary, the end of the rod 112 may be welded to the sleeve 114.

A slot 122a in the clutch pedal 122 permits the raising and lowering of clevis 116b with respect to the clutch pedal, so that when the brake pedal is actuated, the clevis 116b is lowered in the slot. When the clutch pedal 122 is actuated without movement of the brake pedal 22, the clevis 116b is raised in the slot to prevent binding. The clutch pedal 122 is actuated by a clevis 116b through a link 116a loosely fitted in an aperture 116, so that if, for some reason, the brakes are frozen, the clutch pedal 122 may be actuated a short distance, causing the spring 120 to yield so as to release the clutch. As may be clearly seen in Figure 5, the reciprocatory rod 112 extends to the left of the passage or conduit 26 through an insulating block 202. Thus, it is seen that as the clutch pedal 122 releases the clutch, the sleeve 114 actuates the rod 112 to the left, and with it the contact lever 108, as viewed in Figure 2, so as to cause the contact lever 108 to come into engagement with a helical conducting spring 130 mounted upon the terminal 132 adjustably mounted in the casing 134, enclosing the lever 108. This casing is held in position by a pair of spring clips 200, one above and one below the casing. The clips 200 are attached to the insulating block 202 by suitable screws, as clearly shown in Figure 2. The contact 110 is connected by a suitable lead 140 to one terminal of the starter 146, shown in Figure 1. The contact 132 is connected through a lead 144 to one terminal of the battery 142, shown schematically in Figure 1. When the engine is running under normal operating conditions the switch through the starter will not be closed. This has been accomplished by the mechanism which will now be described.

The valve stem 40 carries a tapering valve gate sleeve 150 that has a port 152 in registry with the outlet passage 24 and in registry with the end of piston 100 when the valve stem is in the "down" position shown in Figure 2. The upper portion of member 150, as shown in Figure 2, has not been shown in section and therefore not cross hatched. Merely the lower portion that has been cross hatched is shown in section. When the valve stem is raised, immediately upon the starting of the engine by the diaphragm 48 actuated from the full line position to the dot-dash position by the suction of the motor, the port 152 is moved up out of registry with the exhaust port 24 and out of registry with the piston 100. A passage conduit 204, opening at 206 below the valve 150 and opening at 208 above the valve 150, permits fluid to be supplied both above and below the valve, so that the fluid does not in any manner restrict the free operation of the valve from one position to the other. At the same time, the tip end 150a clears the lower end of a passage 160 extending from the cylinder 102 down to near the lower end of the conduit or passage 26, shown in Figure 2. As the lower tip 150a of the valve gate sleeve 150 clears or opens the passage 160 into the conduit 26, the fluid exerting a pressure upon the piston 100 is released, so as to permit the spring 104 to actuate the piston into "home" position, thereby disconnecting the circuit through the starter. The piston 100 cooperates with the associated passages to form the check valve. Whenever fluid is supplied to the end of piston 100, this piston is actuated to the left, as viewed in Figure 2, so as to open the passage 160 to the fluids actuating the piston 100. As soon as the pressure is released on the fluid, the piston 100 is actuated by the spring towards the right, thereby closing the end of the passage 160. By this arrangement, it can readily be seen that the piston 100 functions as a check valve, in that it checks the return flow of fluid through the passage 160 as soon as the pressure of the fluid supplied to the piston 100 is released. Whenever the engine is running under normal operating conditions, the sleeve 150 remains in the "up" position, so as to block the passage from the outlet 24 to the piston 100, to prevent the hydraulic fluid from actuating the piston 100. Upon the opening of the valve 40, the effectiveness of the check valve 100 is nullified, in that the fluid is then permitted to return through the opening vacated by the needle valve 40.

It is to be noted, as may best be seen by referring to Figure 5, that the tubular valve gate sleeve 150 is provided with a cut-away portion 150b, which moves into registry with the outlet opening 24 of the cylinder 10 when member 150 is actuated into the "up" position by the diaphragm 48 responding to the suction of the engine. This suction may be referred to as differential in pressures. This permits the hydraulic fluid pumped by the piston 12 when the engine is operating to flow down through the conduit 26 into the brake system. The valve stem 40 is then in the "up" position, so as to permit the hydraulic fluid to flow into the brake system and apply the brakes whenever the brake pedal 22 is actuated. In the event it is found necessary to actuate the clutch pedal 122 so as to shift gears while the motor vehicle is operating without applying the brakes, it is merely necessary to actuate the control knob 80 from the full line position to the dot-dash position 80a, to lock or close the passage to the brake system. Then by actuating the clutch pedal 122, the brakes are not applied. However, the release of the clutch for the shifting of gears is not normally required with modern motor vehicles. These automatic gear shifting devices permit the shifting of gears without the manual release of the clutch. When this type of a gear shifting device is used the only time the operation of the clutch enters into the operation of the motor vehicle is when it is desirable to stop the motor vehicle, start the motor vehicle or throw the motor vehicle into reverse.

Whenever the brakes are applied or the clutch is released, the hydraulic fluid closes the circuit through the tail light so designated. This has been accomplished by providing a piston 180 opposite the outlet opening of the passage 160. If the gate valve is in the "down" position, so that the gate valve 150a closes this vent, fluid is supplied downwardly through the passage 160, as viewed in Figure 2, so as to actuate the piston 180 against the spring 182, closing a suitable switch 210 in the tail light circuit. The circuit is closed by the piston 180 actuating the movable contact element of the switch 210 into the dotted position shown in Figure 2, when the circuit through the tail light is closed to ground, thereby completing the circuit. The various electrical parts in the switch 210 are properly insulated, as is well known to those skilled in the art. As soon as the fluid pressure is released, the spring 182 opens the switch to the tail light. In the event the gate valve 150 is in the "up" position, so as to close the passage to the piston 100, fluid is supplied to the piston 180 through the vent opening near the bottom of the conduit 26, so as to close the switch whenever the brakes are applied. The tension of the spring 182 is such that a slight pressure caused by the hydraulic fluid will close the tail light circuit.

In the device described thus far the brakes will not operate in response to movement of the brake pedal 22 when the valve stem 40 is in the "down" position. It is necessary to release this valve by actuating the knob 80 from the full line position to the dot-dash position 80b, in order to apply the brakes.

For some types of installations it may be quite desirable to apply the brakes irrespective of the position of the valve stem 40, so that whether the engine is operating or it is standing still the brakes may be applied in case of an emergency. This has been accomplished by the device disclosed in Figure 7, wherein a by-pass passage 200 shunts the valve 40. When the valve gate 150 is in the "down" position, as shown in Figure 7, and the brakes are applied, the piston 100 will be actuated to the left, as viewed in Figure 7, so as to clear the top of the passage 160, when the fluid will continue to flow through the brake system in shunt relation with respect to the valve 40, so as to apply the brakes. The brakes are automatically applied whenever the clutch pedal 122 releases the clutch and operates the starter, thus insuring the arrest of any movement of the motor vehicle that may be caused by the release of the clutch. This is especially desirable when the driver has left the gears engaged so as to permit the engine to function as a brake. The embodiment shown in Figure 7 is particularly adaptable to motor vehicles having an automatic, or a semi-automatic gear shift, that is, a gear shift which shifts from low to intermediate or to high, or vice versa, without actuating the clutch pedal and to motor vehicles utilizing a fluid transmission wherein the conventional clutch pedal may be used to put the fluid transmission into use.

Upon release of the hydraulic fluid, the piston 100 snaps into the full line position shown in Figure 7, so as to entrap the hydraulic fluid in the brake system, thereby locking the brakes. In this modification the piston 100, in addition to controlling the starter, functions as a check valve.

Although the preferred modification of the device has been described, it will be understood that within the purview of this invention various changes may be made in the form, details, proportion and arrangement of parts, combination thereof and mode of operation, which generally stated consist in a device capable of carrying out the objects set forth as disclosed and defined in the appended claims.

Having thus described my invention, I claim:

1. A hydraulic control mechanism for use in engine driven motor vehicles having brake control means and clutch releasing means, said hydraulic control mechanism including the combination of a fluid actuating device including a source of fluid supply, a cylinder communicating therewith and a piston mounted in the cylinder and actuated in response to movements of the brake control means and to movements of the clutch releasing means for actuating the fluid, a starter switch, and means for actuating the starter switch including a fluid responsive device responding to movements of the fluid actuated in response to movements of the clutch releasing means.

2. A hydraulic control mechanism for an engine driven motor vehicle including brake fluid propelling means actuated by a brake pedal and responding to movements of the clutch releasing pedal of the motor vehicle, a fluid actuated control mechanism for the starter switch of the motor vehicle said control mechanism responding to the brake fluid propelling means, and means responsive to the vacuum created by the engine for disconnecting the fluid actuated starter switch when the engine is started.

3. A hydraulic control mechanism for an engine driven motor vehicle including brake fluid propelling means actuated by a brake pedal and responding to movements of the clutch releasing pedal of the motor vehicle, a switch having an operative position and an inoperative position, said switch being operated by movements of the fluid propelling means and a valve responding to the vacuum created by the engine when it starts for shifting the switch from one position to the other.

4. A hydraulic control mechanism for engine driven motor vehicles and the like having brake control means and clutch releasing means, said hydraulic control mechanism including a fluid actuating device responsive to movements of the brake means and the clutch releasing means, a starter switch, means for closing the starter switch, said means including a mechanically driven and a hydraulically driven member, each responding to movements of the clutch releasing means to close the starter switch.

5. A hydraulic control mechanism for an engine driven motor vehicle having a clutch releasing pedal, said hydraulic control mechanism including fluid propelling means actuated by the clutch releasing pedal, a fluid actuating control mechanism, said fluid actuating control mechanism including a check valve, a starter switch having two pairs of contacts, means responding to the movement of the check valve for closing one pair of contacts in the starter switch, and mechanical means responding to movements of the clutch releasing pedal for closing the other pair of contacts in the starter switch.

6. A hydraulic control mechanism for an engine driven motor vehicle having brake control means and clutch releasing means, said hydraulic control mechanism including a fluid actuating device including a cylinder, a piston mounted for movement in the cylinder, actuating mechanism for the piston including a tubular member and a rod telescopically mounted therein, the tubular member being connected to one of said means and the telescopically mounted rod connected to the other means, whereby movement of either means actuates the piston within the cylinder to propel the fluid.

7. A hydraulic control mechanism for an engine driven motor vehicle having a clutch releasing pedal, said hydraulic control mechanism including fluid propelling means including a cylinder and a piston mounted within the cylinder, means for interconnecting the piston to the clutch releasing pedal so that movements of the clutch releasing pedal actuate the piston, a starter switch having two pairs of contacts, mechanical means for interconnecting one pair of contacts to the clutch releasing pedal, means responding to the movement of the fluid for closing the other pair of contacts and means responding to the starting of the engine for causing one pair of contacts to open.

8. A hydraulic control mechanism for an engine driven motor vehicle including brake fluid propelling means responding to movements of a foot pedal, a starter switch including a flexible lever having a pair of spaced contacts arranged for movement into engagement with a pair of stationary contacts to close the starter switch, mechanical means for interconnecting one end of said flexible lever to the foot pedal so as to actuate one of the contacts into engagement with its stationary contact, and hydraulically driven brake actuating means for actuating the other end of the lever so as to actuate the other movable contact into engagement with its stationary contact.

9. A hydraulic control mechanism for an engine driven motor vehicle including hydraulic control means, hydraulic brakes interconnected to the hydraulic control means, a cylindrical fluid passage conduit, a tapering tubular sleeve-like valve member mounted in said cylindrical fluid passage conduit, a shunt passage, said tubular sleeve-like valve member having a transverse orifice interconnected to the shunt passage when said valve member is in one position, and means for actuating said valve member so as to move the transverse orifice into registry with the shunt passage.

10. In a hydraulic brake system for motor vehicles utilizing an engine creating a vacuum, said system including a hydraulic fluid, the combination including a pair of parallel passages, means for actuating the hydraulic fluid through the passages, a check valve in one of the passages permitting the fluid to flow in one direction and preventing the return of the fluid, and a vacuum responsive valve means in the other passage having an open position and a closed position, said vacuum responsive valve means responding to the vacuum created by the engine to hold the vacuum responsive valve open when the engine is running and to close the vacuum responsive valve when the engine stops.

11. In a hydraulic brake system for motor vehicles utilizing an engine creating a vacuum, said system including a hydraulic fluid, the combination including a pair of passages, means for actuating the fluid through the passages, a check valve in one of the passages permitting the fluid to flow in one direction through the passage but preventing the return of the fluid through said passage, vacuum responsive means for closing the other passage, said vacuum responsive means closing said other passage when the engine stops and opening said other passages in response to the vacuum created by the engine when it runs, and manually controlled means for holding said vacuum responsive means in open position.

12. In a hydraulic brake system for motor vehicles utilizing an engine creating a vacuum, said system including a hydraulic fluid, the combination including a pair of passages, means for actuating the fluid through the passages, a check valve in one of the passages permitting the fluid to flow in one direction through the passage but preventing the return of the fluid through said passage, vacuum responsive means closing said other passage when the engine stops and opening said other passage in response to the vacuum created by the engine when it runs, and manually controlled means for holding said vacuum responsive means in closed position.

13. The combination of a hydraulic brake mechanism with a starter switching device, said combination including a foot pedal for actuating the hydraulic brakes, brake fluid propelling means actuated by the movement of the foot pedal, and fluid actuating control mechanism including a check valve having a plunger and a starter switch, said plunger being actuated by movements of the brake fluid propelling means for closing the starter switch.

14. A hydraulic control mechanism for engine driven vehicles, said hydraulic control mechanism including hydraulic brakes, a valve for locking the hydraulic brakes, means responding to the vacuum created by the engine for actuating said valve so as to move the valve into closed position when the engine stops, and manually controlled means for opening the valve when the engine is stopped.

15. A hydraulic control mechanism for engine driven vehicles, said hydraulic control mechanism including hydraulic brakes, a valve for locking the hydraulic brakes, means responding to the vacuum created by the engine for closing the valve when the engine stops, said means responding to the vacuum opening the valve when the engine operates, and manually controlled means for counteracting the means responding to the vacuum of the engine, said manually controlled means closing the valve while the engine operates.

16. A hydraulic control mechanism for engine driven vehicles, said hydraulic control mechanism including hydraulic brakes, brake fluid propelling means, a valve for locking the hydraulic brakes, means responding to the vacuum created by the engine while running for holding the locking valve open and actuating the same into closed position when the engine stops, a by-pass passage shunting the valve permitting the brake fluid propelling means to apply the brakes, a check valve in the by-pass passage preventing the return of the fluid so that the brakes are locked when the locking valve is in closed position, and manually controlled means for actuating the locking valve against said vacuum responsive means for closing said locking valve when the engine is running and for opening the same when the engine is stopped.

17. A hydraulic control mechanism for an engine driven vehicle having a brake control means and clutch releasing means, said hydraulic control mechanism including a main fluid passage, a needle valve in the main fluid passage, a shunt passage, a second valve member disposed in the main passage, said second valve member being interconnected to the needle valve member, means responsive to the vacuum created by the engine for simultaneously actuating the needle valve and the second valve member, said second valve member being so constructed and arranged as to interconnect the shunt passage to the fluid propelling means when the needle valve is in closed position and close the shunt passage when the needle valve is in open position, and a check valve associated with the shunt passage permitting the brake fluid to flow in one direction but preventing its return.

18. A hydraulic control brake mechanism for an engine driven vehicle, a brake pedal, a clutch pedal for actuating the clutch, hydraulic fluid means for actuating the brakes, said hydraulic fluid means including a piston for propelling the brake fluid, a pair of telescopically mounted members for actuating the piston, one of said members being interconnected to the brake pedal, the other being arranged in spaced relation from the piston and interconnected to the clutch pedal so as to permit the clutch pedal to be actuated through a portion of the stroke for actuating the clutch without actuating the piston, the remaining portion of the operative stroke of the clutch pedal actuating the piston to apply the brakes.

ROYAL C. SMITH.